United States Patent
Skoglund et al.

(10) Patent No.: US 10,311,660 B2
(45) Date of Patent: Jun. 4, 2019

(54) PASSENGER FLOW DETERMINATION

(71) Applicant: FourC AS, Tiller (NO)

(72) Inventors: Tor Rune Skoglund, Tiller (NO); Pål Skjager Løberg, Tiller (NO)

(73) Assignee: FourC AS, Tiller (NO)

( * ) Notice: Subject to any disclaimer, the term of this patent is extended or adjusted under 35 U.S.C. 154(b) by 1 day.

(21) Appl. No.: 15/174,254

(22) Filed: Jun. 6, 2016

(65) Prior Publication Data
US 2016/0358388 A1 Dec. 8, 2016

(30) Foreign Application Priority Data

Jun. 5, 2015 (EP) ..................................... 15170878

(51) Int. Cl.
*G07C 9/00* (2006.01)
*G06Q 50/30* (2012.01)
*H04W 4/04* (2009.01)

(52) U.S. Cl.
CPC .............. *G07C 9/00* (2013.01); *G06Q 50/30* (2013.01); *H04W 4/046* (2013.01)

(58) Field of Classification Search
CPC ......... H04W 4/046; G07C 9/00; G06Q 50/30; G06Q 10/0833; G06Q 2240/00
See application file for complete search history.

(56) References Cited

U.S. PATENT DOCUMENTS

| | | | | |
|---|---|---|---|---|
| 2010/0130239 A1* | 5/2010 | Shaw | ...................... | H04L 51/14 455/466 |
| 2010/0185486 A1* | 7/2010 | Barker | ................... | G06Q 10/06 705/7.31 |

(Continued)

FOREIGN PATENT DOCUMENTS

| | | |
|---|---|---|
| EP | 2 397 995 A1 | 12/2011 |
| WO | WO 2007/061734 A2 | 5/2007 |

(Continued)

OTHER PUBLICATIONS

European Search Report dated Nov. 23, 2015 for corresponding European Application No. EP15170878.1.
European Examination Report dated Oct. 16, 2017 for corresponding European Application No. EP15170878.1.

*Primary Examiner* — Marisol Figueroa
(74) *Attorney, Agent, or Firm* — Renner Otto Boisselle & Sklar, LLP

(57) ABSTRACT

A method of passenger flow determination comprises estimating, by a processor (3,6), whether the number of mobile devices on a vehicle (2) has changed based on signals from mobile devices that were received at a sensor (1) located in the vehicle. The processor may compare an estimate whether the number of mobile devices on the vehicle has changed with at least one other data input to the processor, and this allows the processor to determine whether a change in number of detected devices is caused by someone entering or leaving the vehicle rather than a device being switched on or off.

The processor may be located on the vehicle, and the method may further comprise forwarding information to a second processor (6) remote from the vehicle. The second processor will receive data from many vehicles and therefore has a larger dataset available than the processor on a single vehicle, and so can extract more reliable information about passenger flows.

9 Claims, 4 Drawing Sheets

(56) References Cited

U.S. PATENT DOCUMENTS

| | | |
|---|---|---|
| 2011/0153495 A1 | 6/2011 | Dixon et al. |
| 2012/0071151 A1 | 3/2012 | Abramson et al. |
| 2014/0333769 A1* | 11/2014 | Shibuya ................ H04N 7/183 348/148 |

FOREIGN PATENT DOCUMENTS

| | | |
|---|---|---|
| WO | WO 2013/160251 A2 | 10/2013 |
| WO | WO 2014/121328 A1 | 8/2014 |

* cited by examiner

Receive check message 1

Determine change in detected devices 2

Correlate with other data 3

Discriminate 4

Anonymise 5

Search data 6

Convert to passenger numbers 7

Receive data from on-board computer 21

↓

Receive other data 22

↓

Correlate with other data 23

↓

Data clean-up 24

↓

Aggregate data 25

↓

Discard raw data 26

↓

Search aggregated data 27

↓

Convert to passenger numbers 28

Fig 2B.

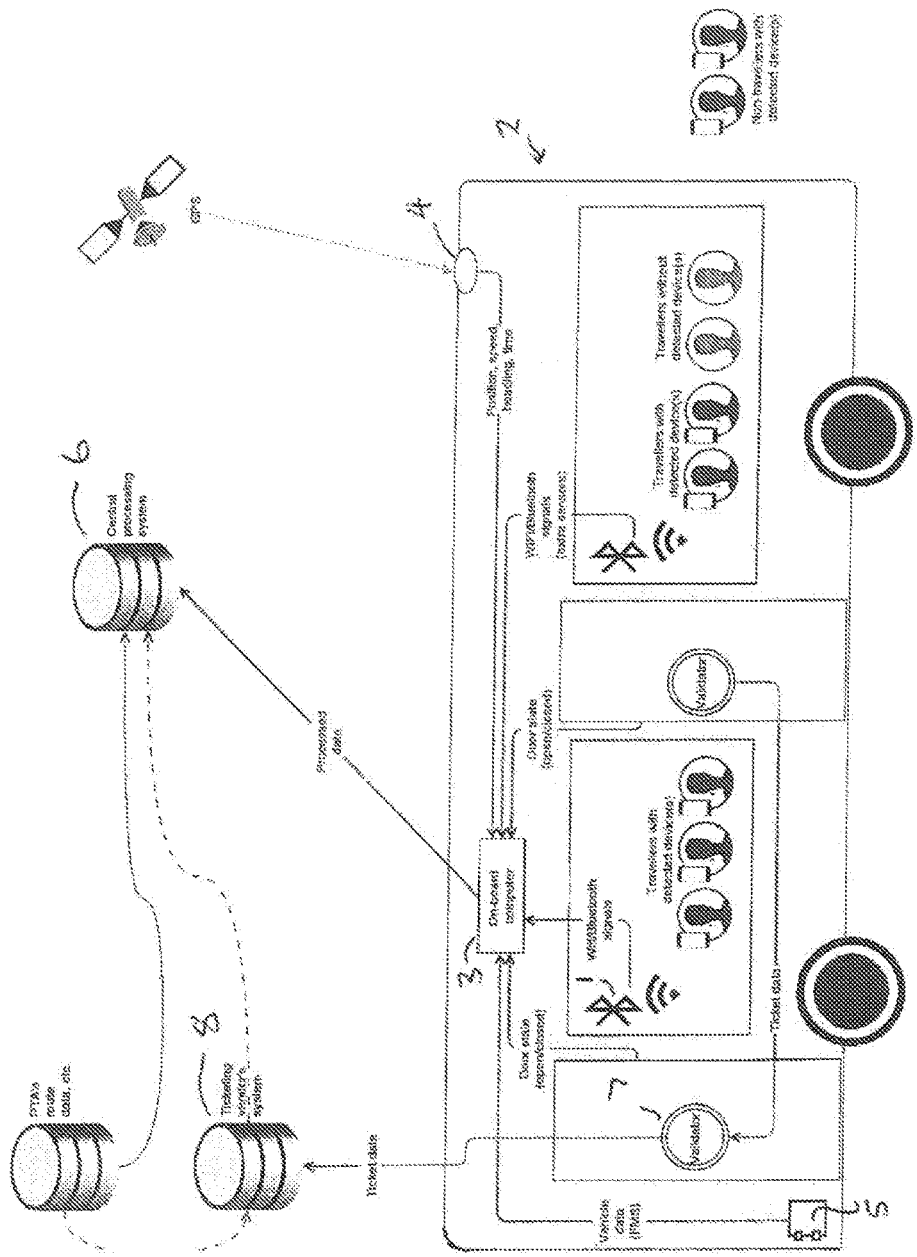

PASSENGER FLOW DETERMINATION

This invention relates to a method of and a system for determination of passenger flow information. The invention is particularly, but not exclusively, intended for use with public transport vehicles, such as a bus, tram, metro etc.

Operators of a public transport system need to have reliable statistics on the flow of passengers through their system, to allow them to provide, where at all possible, capacity that is sufficient to accommodate the demand, without providing an excessive surplus of capacity. In general, the number of passengers travelling on the public transport system varies over the system, may vary between different directions on the same segment of the system, and varies over time.

In the case of a fully-gated public transport system, where a user can only enter or leave the system by putting a ticket into an automatic gate, it is straightforward to collect passenger flow information. However, it is much more difficult to collect passenger flow information in a non-gated public transport system (or a partially-gated public transport system). In this case, it is necessary to find another way of detecting when and where passengers enter or leave a public transport system. This problem is being made worse by the introduction of new forms of ticketing, such as smart cards etc., as passengers might not even be registered on entering a vehicle. (This contrasts with conventional ticketing systems for buses, where a passenger joining a bus would generally buy a ticket from the driver, thereby providing information both as to their origin and destination.)

There exist various passenger counting devices in use on public transport vehicles. For example, infrared sensor systems are known for detecting when a passenger enters or leaves a vehicle—generally, these consist of IR beams across a doorway that are broken when a passenger enters or leaves the vehicle—with the order in which the beams are broken indicating whether a passenger is entering or leaving the vehicle. It has also been proposed to count passengers entering or leaving a vehicle using cameras. However, dedicated hardware such as cameras and IR sensors is costly, and such passenger counting systems also require considerable installation work which is time consuming and expensive. Such devices are also limited to counting passengers and can not be used to identify travel patterns in a transport system.

SUMMARY OF THE INVENTION

An aspect of the invention provides a method of passenger flow determination comprising: estimating, by a processor, whether the number of mobile devices on a vehicle has changed based on signals from mobile devices that were received at a sensor located in the vehicle.

The invention requires only that the vehicle is provided with one or more sensors for sensing signals from mobile devices. The invention may therefore be implemented more easily and cheaply than if, for example, IR passenger counters are used. A mobile device generally broadcasts messages, such as probe requests, while it is turned on even if the device is not in use. The present invention proposes detecting the number of mobile, wireless-enabled devices on a public transport vehicle, for example by detecting these probe requests or similar signals, and using this information to obtain information about when and where mobile devices enter or leave the vehicle. This can be considered as "passive" detection, in that a mobile device may be detected by means of signals that the mobile device would have emitted anyway—the invention does not require that the sensor on the vehicle broadcast a message for a mobile device on the vehicle to reply to. The invention can therefore detect any switched-on, wireless-enabled mobile device in the vehicle, without requiring any modification to the mobile devices or requiring any specific application to be installed on the mobile devices.

The method may comprise comparing an estimate whether the number of mobile devices on the vehicle has changed with at least one other data input to the processor. It may comprise disregarding, or marking to be disregarded, an estimation that the number of mobile devices on the vehicle has changed if this is inconsistent with the at least one other data input to the processor. This improves the accuracy of the estimation.

The at least one other data input may be a data input that is not a direct count or estimate (for example by another passenger counting method) of the number of passengers on the vehicle. For example, it may be a data input that provides information whether it is likely that a passenger could have entered or left the vehicle at a time when an apparent change in the number of passengers on the vehicle is detected.

As an example, the at least one other data input to the processor may comprise data about the speed of the vehicle, and the method may comprise disregarding, or marking to be disregarded, an estimation that the number of mobile devices on the vehicle has changed if this occurs when the vehicle speed is greater than a threshold speed. The threshold speed may be zero, in which case an estimation that the number of mobile devices on the vehicle has changed is disregarded unless it occurs at a time when the vehicle is stationary. Alternatively, the threshold speed may be non-zero.

Additionally or alternatively the at least one other data input to the processor may comprise data about the state of a door of the vehicle, and the method may comprise disregarding, or marking to be disregarded, an estimation the number of mobile devices on the vehicle has changed if this occurs when the door is closed.

Additionally or alternatively the at least one other data input to the processor may comprise data about a location of the vehicle, and the method may comprise disregarding, or marking to be disregarded, an estimation that does not occur at one of a plurality of pre-defined locations.

Additionally or alternatively the at least one other data input to the processor may comprise information indicative of signals from mobile devices that were received by the sensor at a second time, and the method may comprise at least one of one of (A) disregarding, or marking to be disregarded, an estimation that a mobile device has entered the vehicle if the mobile device is not detected at the second time and (B) disregarding, or marking to be disregarded, an estimation that a mobile device has left the vehicle if the mobile device is detected at the second time.

Additionally or alternatively the at least one other data input to the processor may comprise information from a passenger counting system on the vehicle, and the method may comprise at least one of (A) disregarding, or marking to be disregarded, an estimation that a mobile device has entered the vehicle if the passenger counting system has not detected a passenger entering the vehicle or (B) disregarding, or marking to be disregarded, an estimation that a mobile device has left the vehicle if the passenger counting system has not detected a passenger leaving the vehicle.

The phase "detected a passenger entering [leaving] the vehicle" is intended to cover both a direct determination of a passenger entering/leaving the vehicle (for example as made by an IR counting system located at a door of a vehicle) and an indirect determination of a passenger entering/leaving the vehicle (for example as made by an system that records the number of passengers on board a vehicle at a particular time).

The method may comprise anonymising mobile device address information derived from messages that were received at the sensor.

The method may comprise selecting information derived from signals received from one type of mobile device.

The processor may be located on the vehicle; and the method may further comprise forwarding information indicative of the number of mobile devices on the vehicle to a second processor remote from the vehicle.

The second processor may further process the data to derive information about passenger flows. Where the invention is implemented in vehicle of a transport system, it is envisaged that the second processor will receive data from many vehicles, and preferably from all vehicles operating in the transport system (or at least from all vehicles in the transport system operated by one party). The second processor therefore has a larger dataset available than the processor on a single vehicle, and so can extract more reliable information about passenger flows. The second processor is also able to aggregate data received on different days—for example may aggregate data received for journeys on a weekday in a particular month. Moreover, as travel patterns are likely to vary throughout the day, the second processor may also aggregate data received for journeys in a particular time period on different days—for example may aggregate data received for journeys on a weekday between 08.00 and 09.00

A second aspect of the invention provides a processor configured to: receive data from one or more vehicles remote from the processor, the data being indicative of the number of mobile devices on the vehicle(s) and having been generated by a method of the first aspect; combine data received over two or more time periods to generate aggregated data; and determine passenger flow information from the aggregated data. This aspect corresponds to the second processor described above.

The processor may be configured to determine passenger flow information by: obtaining mobile device flow information from the aggregated data; and converting the mobile device flow information to passenger flow information.

The processor may be configured, before combining data received over two or more time periods, to: compare the data received from the one or more vehicles with at least one other data input received at the processor.

A third aspect of the invention provides a computer-readable medium storing instructions that, when executed by a processor, cause the processor to perform a method of the first aspect.

A fourth aspect of the invention provides a processor configured to perform a method of the first aspect.

A fifth aspect of the invention provides a method of receiving, at a processor, data from one or more vehicles remote from the processor, the data being indicative of the number of mobile devices on the vehicle(s) and having been generated by a method of the first aspect; combining data received over two or more time periods to generate aggregated data; and determining passenger flow information from the aggregated data.

The present invention allows the determination of more accurate information about passenger flows in a transport network. This allows the owner/operator of the network to ensure that the services provided in the network are better aligned to passenger demand, allowing more efficient operation and reduced fuel consumption and pollution. At the same time, only modification required to the vehicles operating in the network is the provision of a sensor for detecting signals from mobile devices—and these are cheap and easy to install,

BRIEF DESCRIPTION OF THE DRAWINGS

Preferred embodiments of the present invention will now be described by way of illustrative example with reference to the accompanying figures in which:

FIG. 2B is a block flow diagram showing principal features performed by a central processing system according to an embodiment of the present invention;

FIG. 3 is a block system diagram showing principal components of a system according to an embodiment of the present invention.

The present invention is based upon the fact that an increasing proportion of the population carries a mobile device having wireless-capability (such as Wi-Fi or Bluetooth). When such a device is turned on it periodically broadcasts a probe request, even if the device is not in use. The present invention proposes detecting the number of mobile, wireless-enabled devices on a public transport vehicle, for example by detecting these probe requests, and using this information to obtain information about when and where mobile devices enter or leave the vehicle. This information is then used to estimate passenger flows through the public transport system.

The invention will be described with reference to examples in which probe requests from mobile devices are detected, but this is only by way of a convenient example. In principle the invention may be implemented by detecting any signal sent by a mobile device that contains the MAC address, or other identifier, of the device such as, for example, any wireless control data message or wireless control data request. Moreover, although the MAC address is used as the device identifier in the described examples the invention is not limited to identifying a device by its MAC address, and any suitable identifier of a mobile device may be used. For example, a device may alternatively be identified based on fingerprinting of GSM signals from the device or on content of the probe requests.

Figure 1:
FIG. 1 is a block flow diagram showing principal features of a passenger flow estimation method according to an embodiment of the present invention.
Figure 1:
Figure 1:
Figure 1:
Figure 1:
Figure 1:

FIG. 1 is a block flow diagram showing principal features of a method according to the present invention. At 1, notification is received at a processor, from a sensor 1 mounted in/on a vehicle 2, that the sensor 1 has detected a probe request from a mobile device. The vehicle 2 is depicted as a bus in FIG. 3 but may be any public transport vehicle such as a bus, tram, metro carriage etc.

Although the sensor 1 and the on-board computer 3 are shown as separate structural blocks on FIG. 3, they may be provided in a single physical unit.

At 2 there is a determination whether the number of mobile devices on the vehicle has changed. For example, received probe requests may be stored in a buffer memory, and when a probe request has been received from a particular device, it is possible to search the buffer memory to see if probe requests from that device have previously been detected, or whether the probe request is the first to be received from that device—which would indicate that that mobile device has recently come on-board the vehicle. Conversely, if probe requests are received at the sensor 1 from a device over a period of time but then cease, this indicates that the mobile device may no longer be on-board the vehicle 2.

While determining information about the number of mobile devices present on a vehicle (and hence obtaining information about the number of people on board the vehicle) according to a method of the invention may be accomplished more easily, and provide more information, than prior methods of counting passengers, such as the use of IR detectors to count passengers joining or leaving a vehicle, there are some factors that could lead to possible inaccuracy in the results, for example:

- a person might switch on a mobile device while they were in the vehicle, and this would be detected as a new mobile device even though no mobile device (or person) had boarded the vehicle;
- similarly, a person might switch off a mobile device, or its batteries might run down, and this would be detected as the "disappearance" of a mobile device even though no mobile device (or person) had left the vehicle; or
- a public transport vehicle is typically many times longer than it is wide, whereas the coverage area of the sensors 1 is typically circular (as seen in cross-section from above), —so the sensor 1 may detect a probe request from a mobile device that is actually outside (although close to) the vehicle.

In addition, there is the further factor that not every passenger on a public transport system will have a switched-on mobile device, so that the number of detected mobile devices is unlikely to be equal to the actual number of passengers on the vehicle. Conversely, a passenger may also have multiple devices that are detected.

To address the first three of these problems, the present invention therefore includes a further feature, 3 in FIG. 1, providing at least one other data input and correlating the additional data input(s) with the determined number of devices on board the vehicle—that is estimating whether the number of mobile devices on the vehicle has changed based on both the information received from the sensor and the at least one other data input. An apparent change in the number of mobile devices on the vehicle may then be disregarded, if it is considered to be inconsistent with the at least one other data input. For example, if the number of devices detected on the vehicle changes when the vehicle is travelling at speed this is likely to be because a device has been switched on or off, not because a device has entered or left the vehicle. Data on the vehicle speed is likely to be readily available, for example from the vehicle's fleet management system (FMS) or from a GPS system on the vehicle. Thus, correlating this data with the determined number of devices on board the vehicle provides increased accuracy while not requiring any modification to the vehicle.

At 4, there is an optional discrimination feature of selecting probe requests received from one type of mobile device, and discarding probe requests received from other types of mobile devices. For example, the probe request broadcast by a mobile device may include a "class of device" field, which identifies the type of device (e.g. smart phone, laptop computer, etc.), and this information may be used to select probe requests that are received from one type of device, for example smart phones, for further processing. This may be useful in avoiding double counting—for example if a person has both a smart phone and a laptop, discriminating by selecting probe requests received from only one type of mobile device disc will prevent both devices from being counted.

The probe request broadcast by a mobile device will generally include an identifier of the device, typically the MAC address of the wireless interface of the device. Recording the MAC address, or other device identifier, has the advantage that it allows a determination whether a particular user is a regular user who makes the same journey at the same time every day, or is only an occasional user of public transport, as probe requests received from that mobile device at any time can be "matched" together. In some jurisdictions, however, this may contravene privacy legislation, and 5 of FIG. 1 is therefore an optional feature of anonymising the probe requests received at the sensor. This may be done by, for example, applying one or more "one-way" hash functions to the MAC address derived from a probe request received at sensor 1, so that the data provided by the invention does not make it possible for the identity of individual devices to be determined.

At 6, the data may be searched to obtain information about passenger travel through the public transport network to which the vehicle belongs. As well as obtaining information on the occupancy of an individual vehicle as it travels along its route, it is also possible to obtain information about passengers making a journey that involves transferring from one vehicle to another.

The results obtained at 6 are in terms of numbers of mobile devices. At 7, these results are converted to numbers of passengers, using a suitable model that relates the number of passengers to the number of mobile devices.

The method of FIG. 1 is performed by a computer 3 on-board the vehicle and by a central processor 6. The on-board computer and the central processor 6 are both running suitable programs, such as the "Cities in Motion" software provided by FourC AS. The software may be provided to the on-board computer and the central processor on a suitable computer-readable medium, or it may be downloaded over the Internet. The central processor 6 may be implemented using cloud computing principles. Some features of the invention, such as the correlation at feature 3 may be performed by the on-board computer 3, by the central processor 6, or by both. Some other features will generally be performed by only the on-board computer 3 or by the central processor 6.

The features of FIG. 1 will now be described in more detail with reference to FIGS. 2A and 2B which show features carried out by, respectively, the on-board computer 3, and by the central processor 6 in one preferred embodiment of the invention.

Figure 2A:
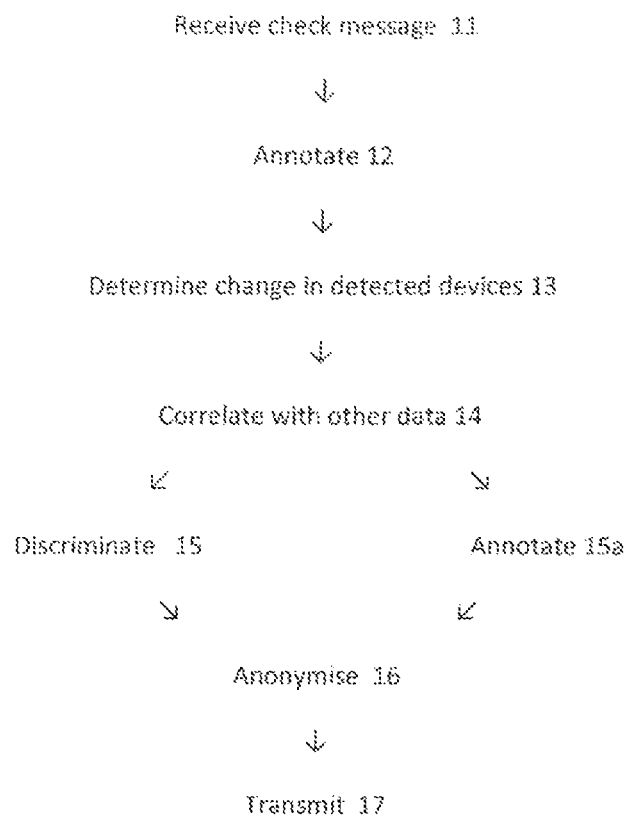
FIG. 2A is a block flow diagram showing principal features performed by an on-board computer according to an embodiment of the present invention.

At feature 11 of FIG. 2A, the on-board computer 3 mounted in the vehicle 2 receives notification from a sensor 1 mounted in/on the vehicle that the sensor 1 has detected a probe request from a mobile device. The vehicle 2 is depicted as a bus in FIG. 2 but may be any public transport vehicle such as a bus, tram, metro carriage etc. The sensor 1 may be any suitable sensor for detecting probe requests from mobile devices, for example such as a Wi-Fi or Bluetooth sensor, and may be a stock WiFi card or Bluetooth dongle. The on-board computer 3 would receive all properties of a probe request received by the sensor 1, as the sensor 1 is not required to perform any processing and just forwards a received probe request to the on-board computer 3. These properties would include the signal strength, the type of probe, frequency/channel, SSIDs being probed, etc. These may be used to identify the device, but most are discarded by the processor.

Most vehicles currently in service have one or more on-board processors, so provision of the sensor 1 is the only hardware modification required to the vehicle 2 to allow the present invention to be implemented.

At feature 12 of FIG. 2A, the on-board computer 3 annotates a received probe request with one or more data items such as, for example, the time and/or date at which the sensor received the probe request, the location of the vehicle when the sensor received the probe request (this may be derived from, for example, GPS signals received by a GPS receiver 4 on the vehicle) The annotated probe request is stored in a buffer memory in or associated with the on-board computer 3.

At feature 13 of FIG. 2A, the on-board computer 3 determines whether the number of mobile devices on the vehicle has changed. For example, when a probe request is received from a particular device, the on-board computer searches the buffer memory to see if probe requests from that device have previously been detected, or whether the probe request is the first to be received from that device—which would indicate that that mobile device has recently come on-board the vehicle. Conversely, if probe requests are received at the sensor 1 from a device over a period of time but then cease, this indicates that the mobile device may no longer be on-board the vehicle 2. The on-board computer 3 determines that a device is no longer on board the vehicle if a probe request is not received from that device after a specified period of time, for example after a period of five or ten times the usual interval between the transmission of probe requests.

At feature 14 of FIG. 2A, the on-board computer 3 performs a first correlation, in which the data for the number of devices on the vehicle is compared with at least one other data input. The on-board computer may then make a determination to disregard an apparent change in the number of mobile devices on the vehicle, if it considers that this is inconsistent with the at least one other data input.

In one example, the on-board computer may receive a further input that is indicative of the speed of the vehicle. This may for example be derived from GPS data received by the GPS receiver 4 on the vehicle and/or from the vehicle fleet management system interface (FMS 5). It is known that people generally only leave a public transport vehicle when it is stationary (except perhaps in the case of some open-platform vehicles, in which case a person can board/alight while the vehicle is travelling at a low speed). In this embodiment, the processor 3 may determine whether a change in number of detected mobile devices on board the vehicle occurred at a time when the vehicle was stationary, and disregard a change in the number of detected mobile devices if the vehicle was not stationary when the change occurred. That is, if the number of devices detected on board the vehicle changes at a time when the vehicle is in motion, it is assumed that this is the result of a person on board the vehicle turning a mobile device on or off, not the result of a person joining or leaving the vehicle. (It will be appreciated that this is not true where a passenger can move from one vehicle to another while in motion, such as in a metro train or multi-unit tram. In these cases it would be necessary to see whether a device detected as leaving one vehicle appears in an adjacent vehicle or whether detection of the device ceases while the train is in motion; this may be done by the central processing system 6.)

In a modification of this embodiment, suitable for use with open-platform vehicles, the processor may disregard any change in the number of detected mobile devices that occurs when the vehicle is travelling above a threshold speed such as, for example, 5 mph.

In another embodiment, the on-board computer 3 may alternatively or additionally receive information as to whether the door or doors of the vehicle are open or closed. At 13, the on-board computer can then determine whether a change in the number of detected mobile devices on the vehicle occurred at a time when the door/doors of the vehicle were open or closed. If it is found that the number of detected mobile devices changed at a time when the door, or all doors, of the vehicle were closed, this suggests that the change in number of detected devices did not occur as a result of a person entering or leaving the vehicle, and the change in number of detected devices can be disregarded. Again, this information is readily available from the vehicle's FMS.

In a further embodiment the on-board computer 3 may additionally or alternatively receive data indicative of the position of the vehicle, for example via the GPS receiver 4 on the vehicle. At 14, the on-board computer 3 may determine the position of the vehicle when the number of detected mobile devices in the vehicle changed, and compare this with a list of pre-determined locations at which passengers are expected to join or leave the vehicle, such as bus stop, calling points etc. If it is found that the number of detected devices in the vehicle changed at a time when the vehicle was not at one of its expected calling points, this again suggests that the change in number of detected mobile devices on the vehicle does not correspond to a person having entered or left the vehicle and the change may again be disregarded. (Again, where a passenger can move from one vehicle to another while in motion, such as in a metro train or multi-unit tram, it would be necessary to determine whether a device detected as leaving one vehicle appears in an adjacent vehicle or whether detection of the device ceases while the train is in motion.)

In a further embodiment, the on-board processor 3 may additionally or alternatively receive information about the probe requests received by the sensor 1 or sensors 1 at a later time, or in a later time-period. If it is found that a device is detected only at one time, or only over a short time period, this suggests that the sensor 1 may have received a probe request from a mobile device that is outside, but close to, the vehicle. In the case of a mobile device that is actually present on the vehicle, it is expected that the device will be detected over a time period that corresponds at least to the time required for the vehicles to travel from one calling point to the next.

If the on-board computer receives information from a passenger counting system on the vehicle, such as an IR counting system or a video counting system the on-board computer 3 may additionally or alternatively compare information from the passenger counting system with the number of detected mobile devices in the vehicle, For example, if the number of devices on a vehicle is detected as changing when information from a passenger counting system on the vehicle shows the number of passengers as staying constant, the on-board computer may determine that this is a result of a device being turned on or off, rather than a result of someone entering or leaving the vehicle.

The on-board processor may annotate an apparent change in the number of detected devices with information derived from the other data input(s), and store the annotated data. This allows greatest flexibility in further processing of the data, but at the expense of requiring storage of greater amounts of data. Alternatively, the on-board processor may discard an apparent change in the number of detected devices if this is found to be inconsistent with the other data input(s).

At 15 of FIG. 2A, the computer 3 may perform an optional discrimination feature of selecting probe requests received from one type of mobile device, and discarding probe requests received from other types of mobile devices. For example, the probe request broadcast by a mobile device may include a "class of device" field, which identifies the type of device (e.g. smart phone, laptop computer, etc.), and this information may be used to select probe requests that are received from one type of device, for example smart phones, for further processing. This may be useful in avoiding double counting—for example if a person has both a smart phone and a laptop, discriminating by selecting probe requests received from only one type of mobile device disc will prevent both devices from being counted.

Alternatively, at 15a of FIG. 2A, the computer 3 may perform an optional feature of annotating a change in the number of detected devices with information identifying the type of device that has been detected as appearing on, or disappearing from, the vehicle.

At feature 16 of FIG. 2A, the computer 3 may perform an optional feature of anonymising the data.

The details of any anonymising process applied at feature 16 will depend on the data it is desired to collect and on the privacy requirements of a territory in which the invention is used. Typically however, the central processing system 6 will instruct the on-board computer 3 which key or keys to use to generate the hash function(s) applied to the MAC address (or other device identifier) derived from a probe request received at the sensor 1. The on-board computer would use a key for a set period of time as instructed by the central processing system 6, after which period the central processing system 6 will instruct the on-board computer 3 to use a new key. The central processing system 6 may either supply a new key to the on-board computer 3, or keys may be pre-stored at the on-board computer 3 so that the central processing system 6 needs only to instruct the on-board computer 3 to stop using one key and start using the next key on the list of pre-stored keys.

The period of validity of a key is preferably much greater than typical journey times in a particular transport network, and can be configured for each network. The period of validity of a key may be lower in a predominantly urban network with short journey than for a rural network with longer journey times. The period of validity is typically 12 or 24 hours, but the invention is not limited to these values.

Once the period of validity of a key has expired, that key may be discarded by both the on-board computer 3 and the central processing system 6.

In some cases it may be sufficient to apply a single hash function to the MAC address (or other device identifier) derived from a probe request received at the sensor 1. For example where the invention is applied in a public transport system that stops running overnight, a key may have a duration of a day, or an integral number of days, and be arranged to change during the period when no services are running.

Where a public transport system provides services continuously, a problem may occur when the key is changed—when the key changes, the hashed version of a MAC address (or other device identifier) derived from a probe request from a particular device will also change. To ensure that a device determined to be present in a vehicle after the change in key can be correctly linked with a device determined to be present in a vehicle before the change in key, it can be arranged for the periods of validity of two keys to overlap. If one key is valid from 6 am to 6 pm, for example, the next key may become valid at a time before the validity of the first key expires—for example the next key may be valid from 3 pm to 3 am. In the period of overlap of validity of the keys, (eg, between 3 pm and 6 pm) the MAC address (or other device identifier) derived from a probe request will be hashed using, separately, both the old key and the new key. This allows the correspondence between the hashed version of a device identifier using the old key and the hashed version of that device identifier to be determined.

Another example where it may be desired to apply two, or more hash functions is of it desired to investigate passengers transferring between different vehicles in a specific part of the public transport network, for example at or near a particular interchange point. In this case the on-board computer may apply a first hash to all device identifiers, and may apply a second hash function to device identifiers received when the vehicle is in a certain geographic area (as determined by the signals received at the GPS receiver 4 on the vehicle). Again, the geographic area over which a second hash function is applied may be configured to suit user requirements.

It should be emphasised, however, that the present invention does not require the interception of any user messages that a user is sending from their mobile device to another mobile device or is receiving at their mobile device. The present invention only need use the probe requests that are periodically broadcast by every wireless-enabled mobile device, to count the number of devices that are transmitting probe requests at any one time. In many countries this does not contravene any legislation, and in this case the feature of anonymising the data may be omitted.

At 17 of FIG. 2A, the processed data are transmitted from the on-board computer 3 to the central processing system. In general this is done by storing the processed data, and transmitting the processed data to the central processing in bursts, for example when the vehicle returns to a depot. This allows the data to be retrieved by providing "docking stations" at which data may be retrieved from the on-board processor at a few selected locations. In principle, however, data may be continuously transmitted from the on-board computer 3 to the central processing system in real-time or near real-time, particularly for vehicles operating only in urban areas As noted above, the data transmitted from the on-board computer at 17 includes information about when a new device is detected on the vehicle, or when a device is detected as no longer present, annotated with other information such as the time, date and position of the vehicle, and possibly annotated with other information such as the vehicle speed, and/or the door state (open or closed) at the time, etc. The exact information that is forwarded at 17 will depend on whether the method involves the discrimination feature, feature 15 and/or the anonymising feature, feature 16 of FIG. 2A.

It should be noted that, dependent on the size of the vehicle, there may be more than one sensor 1 provided in the vehicle. Where more than one sensor is present, each sensor will forward its received probe requests to an on-board processor 3, which will carry out the method of FIG. 2A on each notification received from a sensor. Where a vehicle has two or more sensors and on-board processors, the processing performed at the central processing system 6 will detect whether the same device has been detected by two or more on-board processors, and if necessary delete duplicate records.

Where the invention is applied to a system of two or more coupled vehicles, such as a train, two or more of the vehicles, and possibly all the vehicles, may have a separate on-board processor. The on-board processors of different vehicles would function as autonomous systems and the central system 6 would again identify whether the same the same device had been detected by multiple processors in the system, and if necessary delete duplicate records. The only requirement would be that the multiple processors use the same hash keys for anonymization.

The information that is collected by a vehicle will be a record of the number of detected mobile devices on board the vehicle over a period of time when the vehicle is in service, preferably associated with a record of at least the time, date and location of the vehicle over that same time period. The data may also indicate at what time and location a particular mobile device (as identified by the hashed version of its MAC address) entered the vehicle and at what time and location that mobile device left the vehicle. This will provide the vehicle operator with information about the passenger loading for different segments of the vehicle's route and/or for different times of the day.

While this information may be of value to the vehicle's operator, however, a further aspect of the invention makes it possible to obtain further information about passenger flows through a network, by further processing the data at the remote processing system 6. In particular, the processing at the remote processing system 6 may involve one or both of (a) comparing or combining data received from two or more vehicles to create a more reliable dataset and (b) comparing data received from a vehicle with data received from another source (for example to make more accurate the conversion from a detected number of mobile devices on a vehicle to the number of passengers on the vehicle).

FIG. 2B illustrates actions performed at the remote processing system 6

At 21 of FIG. 2B, the remote processing system receives data from the on-board processor 3 on a vehicle 2. As noted, this data is typically received in bursts, for example when the vehicle returns to a Wi-Fi docking station at its depot. Feature 21 is repeated for other vehicles operating in the public transport network. The central processing system stores the data for later processing and analysis.

At 22 of FIG. 2B, the remote processing system receives data from one or more other sources. The data received may include one or more of:
  data from a ticketing system on the vehicle (these typically transmit their data to a remote computer operated by the ticketing vendor, so that this data will generally not be available to the on-board computer 3);
  data from any passenger counting system, such as IR detectors or video cameras, on the vehicle (again, these typically transmit their data to a remote computer, so that this data will generally not be available to the on-board computer 3);
  route data from the public transport authority/operator, including, for example timetable information for the various routes, real-time travel data, and possibly information about which vehicles were operating on which routes at which times/dates.
  data about mobile devices detected by sensors provided at passenger pick up/set down locations such as bus/tram stops or metro stations.

Additional data at 22 is likely to be received at intervals, for example as batch uploads—so there may be delay of days or even weeks before additional data for a certain date is received by the central processing system 6. The central processing system again stores the data for later processing and analysis.

Once all data for a certain time period has been received at 21 and 22, the central processing system may carry out a further correlating 23, of correlating the data received from a vehicle For example, if the number of devices on a vehicle is detected as changing when information from a passenger counting system on the vehicle shows the number of passengers as staying constant, the central processing system may determine that this is a result of a device being turned on or off, rather than a result of someone entering or leaving the vehicle.

As another example, if a device is newly detected on a vehicle at a time when the data from the ticketing system shows a ticket purchase, the central processing system may determine that this is a result of the device entering the vehicle.

As a further example, if data about mobile devices detected by sensors provided at passenger pick up/set down locations is available, the central processing system may compare this data with data about mobile devices detected on a vehicle. For example, if a mobile device is detected as appearing on a vehicle at a particular location, the system may check whether that device had previously been detected at that location. If so, this would suggest that a passenger had been waiting at that location (eg, a bus stop) and had boarded the vehicle when it arrived—and the central processing system would have higher confidence that this corresponded to a passenger boarding the vehicle at that location. Similarly, if a mobile device is detected as disappearing from a vehicle at a location, and the device is then detected by sensors at that location, this indicates with high confidence that the person carrying the device did indeed leave the vehicle at that location.

If required, at 24 the central processing system performs a "clean-up" on the correlated data, for example by identifying duplicate entries. For example, in a case where a vehicle has multiple sensors and on-board processors the central processing system may determine at 24 whether a device has been detected by more than one sensor, and eliminate any duplicates. Where the invention is applied to a system of two or more coupled vehicles, such as a train, the central system 6 would again identify whether the same the same device had been detected by multiple processors, and if necessary delete duplicate records. Additionally or alternatively, where the invention is applied to a system of two or more coupled vehicles, such as a train, the central system 6 may compare records from the different vehicles in a train to see whether a device that disappeared from one vehicle re-appeared in the next vehicle (indicating the passenger had moved from one vehicle to the next) or not.

At 25 in FIG. 2B, the central processing system 6 aggregates the data. The way in which this is done may again be configured to suit requirements of a particular user. For example, the central processing system 6 may aggregate the data by combining data for all weekdays (except public holidays) in a month, combining data for all Saturdays in a month, and combining data for all Sundays and public holidays in a month. The data may be further grouped according to other parameters, such as university term time versus university vacation. This increases the size of the data sample and thereby increases the reliability of information derived from the sample, and also acts as a further anonymising feature.

As noted, some data may be supplied at 22 as batch uploads. It may therefore happen that the central processing system may receive further data after it has generated the correlated data at 23. If this happens, the features of generating the correlated data at 23, cleaning the data (if required) at 24, and aggregating the data at 25 may be repeated.

The raw data received at 21 and 22 may then optionally be discarded at 26 in FIG. 2B.

The central processing system 6 then analyses the aggregated data. This is configured according to requirements of the user.

In one example, at 27 the central processing system may, for a particular calling point in the public transport network, determine the destinations of people joining at that calling point, the number of people travelling to each destination, the time taken, etc. This may be broken down by time, so that results for journeys starting at that calling point between 8 am and 9 am may be compared with results for journeys starting at that calling point between 5 pm and 6 pm. This may be repeated for other calling points in the network.

As a further example, the central processing system may, for a particular calling point in the public transport network, determine where people leaving a vehicle at that calling point go. For example, assume that the data received at the remote processing system from one vehicle indicates that a mobile device having a particular hashed identifier left the vehicle at a certain stop and at a certain time. The remote processing system 6 may then look at data received from other vehicles to see whether that mobile device was reported a boarding another vehicle at a nearby location soon after that time. This allows a passengers full journey through the public transport network to be determined, to provide information on passenger interchanges between one route and another etc. The central processing system may be configured to determine that a passenger has made a transfer from one route to another if their mobile device is detected as boarding another vehicle within a certain time and/or a certain distance from the time/place they left the first vehicle. The exact time and/or distance that denotes a transfer in the course of a single journey may be configured according to location—for example being lower in a city-centre location than in rural location.

In a further example, assume that the data received at the remote processing system from a vehicle indicates that a mobile device having a particular identifier made a certain journey at a certain time on one day. The remote processing system 6 may then look at data received on other days to see whether that mobile device was reported as making the same journey, at around the same time, on other days. This provides information on how many passengers are repeat travelers (eg, commuters) and how many make occasional journeys. This would however require that the key for the hash function is valid for more than 24 hours.

The results of the analysis of the aggregated data at 27 relate to numbers of mobile device, not to numbers of passengers. The central processing system accordingly converts the results of the analysis to numbers of passengers, but using a suitable model. In the simplest form the model is a constant number which is multiplied by the number of detected devices to give the number of passengers. In general this would however be too crude, since the ratio of mobile devices to people may vary with time of day and/or with route or geographic area as a result of different classes of passengers travelling. The model used is therefore preferably dependent on time of day and/or on the route/ geographic area.

The model may be generated by comparing passenger flow information obtained at according to the invention with other passenger flow information. For example, information obtained using the invention may be compared with information from passenger counting systems on the vehicles, with information from ticketing systems, and/or with information from manual passenger surveys to obtain the model.

Once generated, the model may continuously or periodically be refined, by repeating the process of comparing passenger flow information obtained using the invention with passenger flow information obtained from other sources.

The model may be generated and/or refined by the remote processing system. For example, as noted the remote processing system may receive information from a ticket vending system 7 on the vehicle, such as how many tickets, and of what value, are purchased on the vehicle. In principle, this information could be supplied direct to the remote processing system, but in practice it is likely that information from the vehicle ticket vending system 7 will be transmitted to/retrieved by a processing system 8 operated by the ticket vendor (who may or may not be the same party as the vehicle operator), and data are subsequently passed from the processing system 8 operated by the ticket vendor to the remote processing system. The data supplied the processing system 8 operated by the ticket vendor may include data relating to the number of tickets issued on a particular journey (where the term "issued" may include one or more of "sold", "validated", "cancelled", "smart card debited", etc., depending on the ticketing system used). This provides a source of information about the number of passengers on the vehicle, (for example the expected number as determined from average ticket sales over a certain period), and the remote processing system can compare this information with the data relating to the detected number of mobile devices on the vehicle. This allows the remote processing system to determine a model of how the number of detected mobile devices on the vehicle relates to the number of passengers on the vehicle.

The remote processing system may use an AI model (using machine learning and/or heuristics) to generate and/or refine the model. It may be found that the input which has most effect on the model (from the possible inputs of the number of detected devices, passenger counting (from ticketing, manual counting, "classic" IR gates in the doors, etc), route, date/time, and other sensor inputs) could change over time as often happen in machine learned models.

As noted the remote processing system preferably also receive other available passenger flow information. For example if the public transport authority has collected data on passenger flows by, for example, surveys over a certain time period, this information may be supplied from the PTA's database 9 to the remote processing system 6—and the remote processing system may again use this to determine the model of how the number of detected mobile devices on the vehicle relates to the number of passengers on the vehicle.

At 28 the central processing system uses the model to convert the results obtained at 27 to passenger numbers.

If required to comply with legislation concerning data storage, or to reduce storage requirements, the invention may include an optional further feature of periodically deleting aggregated data from the system, once the data have been processed.

It should be understood that FIGS. 2A and 2B describe only one possible way in which the present invention may be implemented, and the invention is not limited thereto. For example, it would be possible for the feature of correlating detected changes in the number of devices on the vehicle with one or more other data sources to be carried out solely by the central processing system. Provided that the on-board computer annotates the information it provides to the central processing system with information about, for example the door status, the central processing system is then able to compare changes in detected device numbers with the door status and disregard any changes in detected device numbers that are incompatible with the indicated door status.

In principle the feature of correlating detected changes in the number of devices on the vehicle with one or more other data sources could be carried out solely by the on-board computer 3. This would however only be possible if data such as the data from passenger counting systems or ticketing data were available to the on-board computer.

The invention claimed is:

1. A method of passenger flow determination comprising:
repeatedly detecting for different time points, with a sensor on a vehicle, signals emitted by mobile devices located on the vehicle, wherein the sensor is configured to detect wireless signals;
estimating, by a processor, a number of mobile devices located on the vehicle at the different time points based on the signals detected by the sensor;
when a change in the number of mobile devices located on the vehicle between two different time points is estimated, verifying the change in the number of mobile devices based on at least one other data input to the processor;
when the at least one other data for a particular change in the number of devices is inconsistent with a change in the number of devices located on the vehicle, identifying with the processor that the particular change in the number of mobile devices is to be disregarded, wherein:
the at least one other data input to the processor comprises a speed of the vehicle; and
the at least one data for the particular change is inconsistent with the change in the number of devices located on the vehicle when the vehicle speed during the particular change is greater than a threshold speed; and
generating by the processor passenger flow data based on the estimation of the number of mobile devices on the vehicle, wherein the passenger flow data identifies locations that users carrying the mobile devices entered and exited the vehicle and a timing that the users entered and exited the vehicle.

2. The method as claimed in claim 1, wherein:
the at least one other data input to the processor comprises a state of a door of the vehicle; and
the at least one data for the particular change is inconsistent with the change in the number of devices located on the vehicle when the door is closed during the particular change.

3. A method as claimed in claim 1 wherein the at least one other data input to the processor comprises data about a location of the vehicle, and comprising disregarding, or marking to be disregarded, an estimated change in the number of mobile devices located on the vehicle between two different time points if the estimated change did not occur at one of a plurality of pre-defined locations.

4. A method as claimed in claim 1 wherein the at least one other data input to the processor comprises information indicative of signals from mobile devices that were received by the sensor at a second time, and comprising at least one of one of (A) disregarding, or marking to be disregarded, an estimation that a mobile device has entered the vehicle if the mobile device is not detected at the second time and (B) disregarding, or marking to be disregarded, an estimation that a mobile device has left the vehicle if the mobile device is detected at the second time.

5. A method as claimed in claim 1 and comprising anonymising mobile device address information derived from messages that were received at the sensor.

6. A method as claimed in claim 1 and comprising selecting information derived from signals received from one type of mobile device.

7. A method as claimed in claim 1 wherein:
the processor comprises a first processor and a second processor;
the first processor is located on the vehicle and estimates the number of mobile device located on the vehicle; and
the second processor is located remote from the vehicle and generates the passenger flow data.

8. A processor configured to:
receive data from at least one vehicle remote from the processor, the data being indicative of the number of mobile devices located on the at least one vehicle at different time points based on signals detected at the different time points using a sensor on the vehicle, wherein:
the sensor Is configured to detect wireless signals; and
when a change in the number of mobile devices located on the vehicle between two different time points is estimated, the change in the number of mobile devices is verified based on at least one other data;
when the at least one other data for a particular change in the number of devices is inconsistent with a change in the number of devices located on the vehicle, identifying that the particular change in the number of mobile devices is to be disregarded, wherein:
the at least one other data comprises a speed of the vehicle; and
the at least one data for the particular change is inconsistent with the change in the number of devices located on the vehicle when the vehicle speed during the particular change is greater than a threshold speed; and
generate passenger flow data based on the estimation of the number of mobile devices on the vehicle, wherein the passenger flow data identifies locations that users carrying the mobile devices entered and exited the vehicle and a timing that the users entered and exited the vehicle.

9. A non-transitory computer-readable medium storing instructions that, when executed by a processor, cause the processor to perform a method as defined in claim 1.

* * * * *